United States Patent [19]
Aeschbacher et al.

[11] Patent Number: 5,920,032
[45] Date of Patent: Jul. 6, 1999

[54] CONTINUOUS POWER/SIGNAL CONDUCTOR AND COVER FOR DOWNHOLE USE

[75] Inventors: William Edward Aeschbacher, Houston, Tex.; David G. Korte, Siloam Springs, Ark.; Larry V. Dalrymple, Claremore, Okla.

[73] Assignee: Baker Hughes Incorporated, Houston, Tex.

[21] Appl. No.: 09/056,911

[22] Filed: Apr. 8, 1998

Related U.S. Application Data

[63] Continuation of application No. 08/790,036, Jan. 28, 1997, abandoned, which is a continuation-in-part of application No. 08/361,592, Dec. 22, 1994, abandoned.

[51] Int. Cl.⁶ ........................................................ F16L 11/12
[52] U.S. Cl. ................... 174/47; 174/102 R; 174/113 C; 174/116; 138/113; 219/60.2; 228/143
[58] Field of Search ..................... 174/47, 27, 28, 174/30, 29, 31 R, 14 R, 102 R, 113 C, 131 A, 116; 406/112, 119; 138/113, 112, 111; 228/143, 145, 150; 219/60.2; 428/129

[56] References Cited

U.S. PATENT DOCUMENTS

| | | | |
|---|---|---|---|
| 1,856,109 | 5/1932 | Murray | 174/146 |
| 1,976,804 | 10/1934 | Ringel | 174/28 |
| 2,204,737 | 6/1940 | Swallow et al. | 174/28 |
| 3,663,799 | 5/1972 | McArn . | |
| 3,846,610 | 11/1974 | Asselborn et al. | 219/61 |
| 4,022,516 | 5/1977 | Smith et al. . | |
| 4,032,708 | 6/1977 | Medney . | |
| 4,053,338 | 10/1977 | Bolin . | |
| 4,055,053 | 10/1977 | Elfving et al. . | |
| 4,256,146 | 3/1981 | Genini et al. | 138/111 |
| 4,346,253 | 8/1982 | Saito et al. . | |
| 4,745,238 | 5/1988 | Kotthaus et al. . | |
| 4,896,701 | 1/1990 | Young . | |
| 4,939,317 | 7/1990 | Hostler . | |
| 5,060,737 | 10/1991 | Mohn . | |
| 5,344,062 | 9/1994 | Krengel et al. | 228/147 |

FOREIGN PATENT DOCUMENTS

| | | |
|---|---|---|
| 0 373 120 A1 | 6/1990 | European Pat. Off. . |
| 542584 | 5/1993 | European Pat. Off. . |
| 666197 | 8/1936 | Germany . |
| 681787 | 1/1938 | Germany . |
| 629618 | 5/1960 | Italy . |
| 660817 | 11/1961 | Italy . |
| 53-54231 | 11/1979 | Japan . |
| 511683 | 8/1939 | United Kingdom . |
| 629207 | 10/1947 | United Kingdom . |
| 676224 | 5/1948 | United Kingdom . |
| 688619 | 6/1949 | United Kingdom . |
| 1073606 | 1/1965 | United Kingdom . |
| 1124081 | 2/1965 | United Kingdom . |
| 1249741 | 7/1969 | United Kingdom . |
| 1260339 | 7/1969 | United Kingdom . |
| 1268280 | 11/1969 | United Kingdom . |
| 2015690 | 9/1979 | United Kingdom . |

OTHER PUBLICATIONS

Anonymous Research Disclosure, "All plastics protective sheathing arrangement", No. 106 (Feb. 1973).

*Primary Examiner*—Kristine Kincaid
*Assistant Examiner*—Dhiru R Patel
*Attorney, Agent, or Firm*—Rosenblatt & Redano P.C.

[57] ABSTRACT

Conductors are placed in insulator which acts as a spacer/centralizer for the conductors, which are in turn mounted within tubing. The void spaces between the insulator and the tubing inside wall can be filled with a sealing material. Alternatively, the voids around the substantially centralized conductors can be used as flow channels for the transmission of fluid pressure to a remote location, such as downhole. The conductors are protected because they are kept away from the tubing wall and can be further protected by the addition of the sealing material.

16 Claims, 2 Drawing Sheets

CONTINUOUS POWER/SIGNAL CONDUCTOR AND COVER FOR DOWNHOLE USE

RELATED APPLICATIONS

This application is a continuation of application Ser. No. 08/790,036, filed Jan. 28, 1997 now abandoned, which is a continuation-in-part of application Ser. No. 08/361,592, filed on Dec. 22, 1994, now abandoned,

FIELD OF THE INVENTION

The field of this invention relates to control lines which can transmit fluids to remote locations and, more particularly, control lines which can be used in oil and gas operations, such as subsea, wherein it is also advantageous to transmit electrical, optical, or any other signals to a remote point.

BACKGROUND OF THE INVENTION

In many applications in the oil and gas industry it is desirable to transmit fluid pressure to a remote location for actuation of equipment, as well as to run electrical or other types of conductors for either transmission of signals or power to or from the surface to a subsurface location or for other reasons. Typically, a conduit which, if small and sufficiently flexible, can be unrolled from a roll is run along side the production tubing or otherwise into a borehole. If signals are to be sent from the wellbore to the surface electrically, a separate cable has been used, which many times is bundled to the exterior of the control tubing such that the hydraulic signals pass through the control tubing while the electrical, generally low-voltage signals, which record any number of downhole well conditions or operate low-voltage equipment, use the adjacent cable for transmission of such signals. It has also been attempted in the past to run the electrical signal cable into and through a coiled tubing unit. In those instances, the signal cable is externally shielded to prevent any signal interference from the surrounding tubing structure. One of the problems in this type of installation has been that the shielded cable would develop flaws or pinholes in its outer protective casing, which would then allow the fluids to migrate into the cable, damaging the signal conductors therein. Additionally, another problem encountered with such designs is that the conductor cable running through the tubing could in many places orient itself adjacent the tubing wall, particularly if the well was in any way deviated. The contact between the electrical cable and the tubing wall could cause two problems. First, it could cause abrasion of the shield material against the inside surface of the tubing wall, which ultimately would result in compromising the integrity of the covering for the conductors. This, as previously described, could cause a breakdown in the ability to transmit signals through the conductors. Additionally, close proximity to the tubing wall also rendered the internal cable vulnerable to damage from mechanical impacts on the tubing in situations where the cable is located up against the inside tubing wall. Such impacts could cause dents in the tubing wall, which would translate directly to the cable damaging and perhaps severing the cable. Finally, and to a lesser extent, close proximity to the inside wall of the tubing also created some potential risk of signal interference from the metallic tubing wall.

Space is routinely at a premium in oil and gas installations, particularly in offshore applications. It is frequently desirable that the external control tubing have a small diameter as possible, while, at the same time, it must have the necessary rigidity and internal diameter to allow accommodation of an internal conductor. What is desirable and heretofore lacking in the known equipment is a compact design where a conductor can be effectively isolated and located reasonably centrally to the tubing to minimize damage to the cable from impacts to the tubing. Additionally, with the conductors positioned within the tubing and their position retained away from the tubing wall, the spaces around the conductor can be used to allow fluid flow or, in the alternative, can be filled with a sealing material which provides further durability to the assembly of conductors, insulators/centralizers, and void sealant, all disposed within the tubing.

SUMMARY OF THE INVENTION

Conductors are placed in insulator which acts as a spacer/centralizer for the conductors, which are in turn mounted within tubing. The void spaces between the insulator and the tubing inside wall can be filled with a sealing material. Alternatively, the voids around the substantially centralized conductors can be used as flow channels for the transmission of fluid pressure to a remote location, such as downhole. The conductors are protected because they are kept away from the tubing wall and can be further protected by the addition of the sealing material.

DETAILED DESCRIPTION OF THE DRAWINGS

FIG. 1 is a sectional view of the tubing, showing the conductor therein with a filling in between.

DETAILED DESCRIPTION OF THE PREFERRED EMBODIMENT

Figure 1:
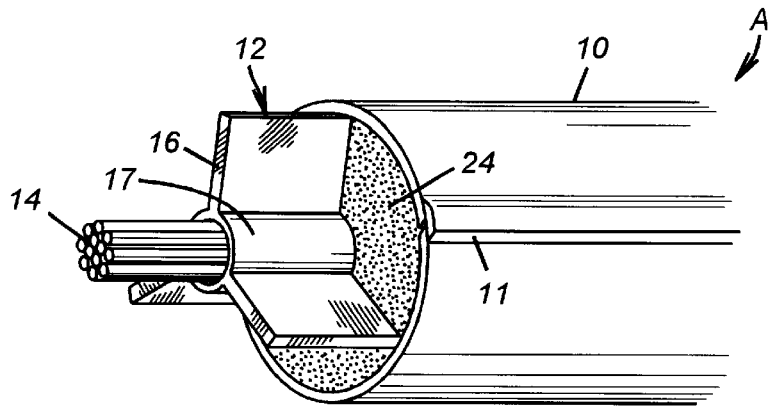
Figure 2:
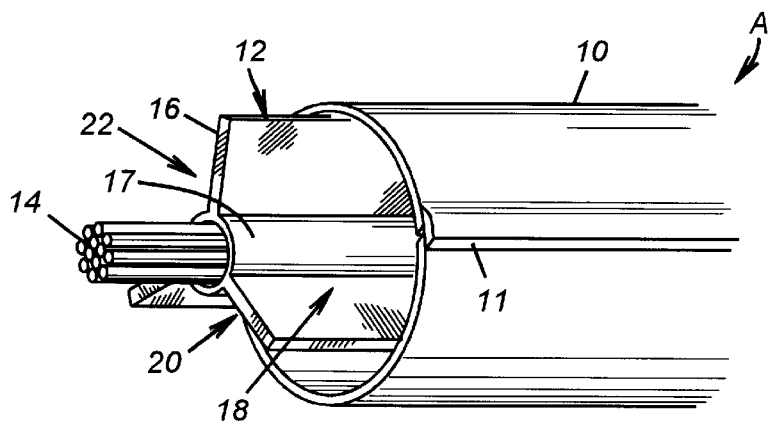
FIG. 2 is the view of FIG. 1 without the filling.
Figure 4:
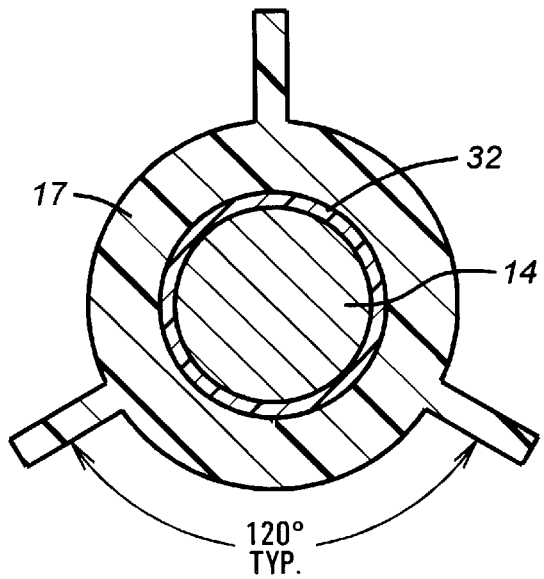
FIG. 4 is a section showing the wrap of insulation between the conductor and the shaped insulator.
Figure 5:
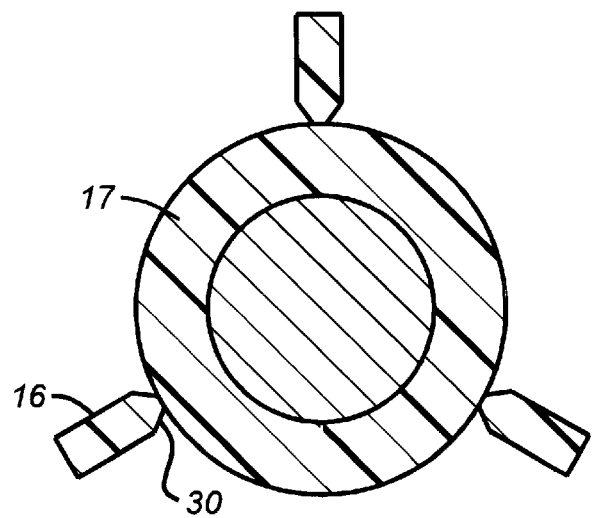
FIG. 5 is another section illustrating the notch feature on the fins of the shaped insulator.

FIG. 1 illustrates the apparatus A of the present invention. It comprises an external housing or tube 10 which can be made in a variety of corrosion-resistant materials, including metals such as 316 Stainless Steel, Inconel, as well as rigid plastic materials. Inside the housing 10 is a spacer 12. Inside the spacer 12 is conductor or conductors 14. Conductors 14 can be one or more strands which collectively can transmit a signal. A strand or groups of strands can be separately bundled and shielded before being mounted to the spacer 12. In this manner, the tubing or housing 10 carries a plurality of potential signal or power transmission avenues within the same spacer 12. In the preferred embodiment, the spacer 12 has a plurality of radial projections 16, which are spaced at 120° intervals, and which extend radially from a hub or core 17, to create three parallel flowpaths 18, 20, and 22. The flowpaths can be used as such or can in the alternative, as shown in FIG. 1, be filled with an epoxy 24. By adding the epoxy 24, additional protection for the conductors 14 is provided. The radially extending members 16 also help to centralize the conductors 14 and keep them away from the outer housing 10. By centralizing the conductors 14, they are less prone to be damaged. Furthermore, the control signals passing therethrough are less likely to suffer interference from adjacent metal components, such as housing 10. When the assembly is put together, as shown in FIG. 1, with the flowpaths 18, 20, and 22 further filled with epoxy, the assembly becomes more durable in withstanding mechanical shocks but yet remains sufficiently flexible to allow coiling of the housing 10 onto a roll (not shown) for easy storage and dispensing when needed. While the preferred embodiment indicates the conductors to be centralized, an offset location, but removed from the housing or tubing 10, is still within the purview of the invention. While three radial extensions 16 are shown in the preferred embodiment, different configurations can be employed to accomplish the positioning feature of getting the conductors 14 away from the tubing 10. For example, a fewer or greater number of radially extending fins, such as 16, can be used. Different geometric shapes that extend from a hub that encircles the conductors 14 can be used, such as a single helix or a multiple helix, as long as their spacing is not so great or radial extension too small so as to allow the hub that surrounds the conductors to engage the inner wall of the housing or tubing 10. The conductors 14 can be further wrapped with a signal-insulating material prior to being inserted into the spacer 12. The insulating material is illustratively shown in FIG. 4 as item 32. As shown in FIG. 4, it wraps around the conductor 14 such that the hub 17 is applied over the signal-insulating material 32. The insulation 32 can be in a single or multiple layers applied to the conductor 14 before application of the hub 17 and the extending member 16. The insulation 32 can be made from a variety of materials, including but not limited to varnish composites, bonded or unbonded tapes applied either longitudinally or spirally with overlap, sintered powders or extruded compounds. The insulation 32 can also be extruded over the conductors 14. Co-extrusion of the insulation 32 with the hub 17 and extending member 16 can be accomplished if the appropriate materials are selected. Alternatively, multi-pass extrusion techniques can be used. Layer-to-layer bonding may be desirable but not required for the composite construction; thus, the insulation 32 can be selectively bonded to the conductors 14 or the hub 17, depending on the application. Dissimilar materials can be used as between the hub 17 and the insulator 32. The insulator 32 can be made from polyimide tape, with the hub 17 made of ETFE or PVDF (polyvinyl difluoride). The addition of the insulator 32 enhances the electrical integrity of the conductors 14, particularly if the outer tubing tube 10 is damaged in any way. The filler material 24 also aids the retention of electrical integrity to the conductor 14. The insulating material 32 can also include high-temperature compounds which contain fluoride compounds and silicones or, in the alternative, mineral insulation. Use of these materials, in combination with the epoxy 24 in the flowpaths 18, 20, and 22, adds crush resistance to minimize insulation compromise. Additionally, the presence of the insulating layer 32 facilitates the making of end connections. When the hub 17 and extending member 16 are bent at a termination to deliberately expose the conductor 14 for making connections, the presence of the insulating layer 32 promotes cracking of the hub 17 in reaction to bending so that a portion of the hub 17 and the extending member 16 can be removed easily from the end of the conductor 14. The addition of the insulating layer 32 minimizes the risk of damaging the conductors 14 in the bending process that is used to remove the last segment of the hub 17 from an end of the finished assembly to facilitate the making of a connection. Without the insulating layer 32, the degree of bending that may be necessary to break the hub 17 to get it off of the conductor 14 may also result in damage to the conductors 14, which would be undesirable. The insulating layer 32 remains intact after the hub 17 is scored and snapped off.

In the preferred embodiment, the spacer assembly 12 is extruded onto the insulator 32 which is mounted over conductors 14 while the tubing, which originally comes in a flat sheet, is rolled into a tubing form and the seam 11 is welded around the spacer 12. The assembly is so oriented so that the seam which forms the tubing 10 is not aligned with any one of the radially extending members 16 to avoid any damage to them during the welding or brazing process. In this manner, a continuous-length segment of the apparatus A can be assembled and rolled onto a reel as it is put together. The length can vary depending on the distances from the surface to the downhole components in a typical application. The connections are at either end of the continuous length, with one connection at the downhole equipment and the other at the surface.

Figure 3:
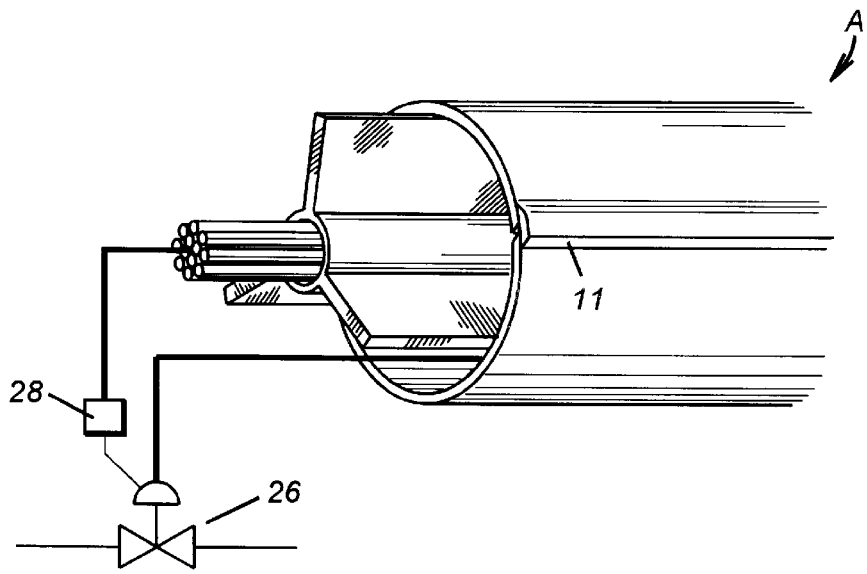
FIG. 3 is the view of FIG. 2, with a schematic representation of a combination of a hydraulic and electrical element showing a typical application of the apparatus of the present invention.

FIG. 3 illustrates the application of the apparatus A in a schematic manner to allow for operation of a hydraulically actuated component, as well as at least one electrically actuated component. The hydraulically actuated component is schematically illustrated as a valve 26, but could in an actual application could be any one of a number of different components. The electrical segment is illustrated as box 28. In a particular application, the hydraulically actuated component can be a downhole valve which is operated by a shifting sleeve or some other hydraulically-actuated operator, and the box 28 can be a sensor or sensors which can respond to indicate whether a shaft has turned, or a sleeve has shifted, or the like. Separate signal-carrying capacity can be provided within hub 17 if conductors are separately bundled and insulated as a group prior to having hub 17 extruded over them. In this way, multiple signal or error transmission functions can be simultaneously serviced.

Many potential applications are possible for the apparatus A of the present invention. For example, the apparatus A can be used to operate a solenoid-operated safety valve with hydraulic communication capability for an insert valve. The apparatus A can also be used for proximity indicators or position sensors to indicate if a valve is full open or full closed. An electrically operated mechanism to lock a flapper on a subsurface safety valve in the open position can be operated with the apparatus A of the present invention. Other applications include: (1) downhole control line pump and reservoir to eliminate hydrostatic head on deep-set valves, (2) a solenoid to operate the flapper on a subsurface safety valve without stroking the flow tube, (3) an electrical assist mechanism for stuck flow tubes, (4) electrical communication for wireline tools, (5) electrical/hydraulic shuttle valve operation for ultra deepset applications, (6) electrically operated equalizing devices, (7) electrically controlled adjustable orifices or chokes, (8) flowing pressure and temperature transducers at subsurface safety valves, (9) electrically operated communication features for insert valves, (10) control line pressure transducers, (11) backup electrical actuators in case of hydraulic failure, (12) pH sensors at a valve to monitor control line or tubing fluids, (13) load cell communication to determine valve position, packing element, or a slip load, (14) constant power source for an electromagnetic valve, (15) proximity sensors for subsea actuators, (16) electrically operated lock-open devices for a subsea actuator, (17) electrically operated lock-close devices for a subsea actuator, (18) electrical permanent lock-open device for subsurface safety valves, (19) electrical override for subsea actuator to open gate valve, and (20) electrical release mechanism for subsea actuator to release connection between the actuator and the valve stem during removal. These are some of the applications, although many others can be employed without departing from the spirit of the invention.

To the extent the passages 18, 20, and 22 can be isolated from each other separate pressure signals in each path can be transmitted to a remote point such as subsea.

In the preferred embodiment, the spacer is made from extruded TEFZELO®, which is a PTFE fluorocarbon material available from E.I. Dupont. In the preferred embodiment, if encapsulation of the spacer 12 is desired, an epoxy resin, which is a mixture of a plasticizer, a resin, and a curing agent, provides an effective gas/fluid block if the tubing 10 is penetrated. Other materials can be used in lieu of the epoxy resin if they are pumpable and can provide the shock protection and gas/fluid blocking protection for the conductor 14. An alternative embodiment can be the provision of the outer jacket 10 in a material called SANTOPREME®, which is available from Monsanto Company, St. Louis, Missouri.

One of the advantages of the construction of the apparatus A is that the outer jacket 10 can be stripped off, as required, without damaging the inner conductor 14. In the preferred embodiment, a bundle of 18 gauge copper conductor forms the main conductor 14 running through the spacer 12. The use of the epoxy material, which acts as an incompressible fluid, significantly increases the compressive and collapse strength up to four times that of an unfilled tube. Under compression, the epoxy material acts as a fluid cushion and provides additional protection that is now not available with other types of downhole cable. The exterior housing or jacket 10 also shields against electrical noise, while the entire assembly is economical and permits multiple reruns. The filler totally fills the flowpaths 18, 20, and 22, but partial filling is also within the scope of the invention.

In the preferred embodiment, the housing 10 has a seam which is electron-beam welded. The spoke-like profile of the preferred spacer 12 allows the insulation of the conductors 14 to be oriented during the welding process to put a seam between the two spokes, thereby reducing the possibility of contaminating the well with insulation material and reducing the heat transfer from the insulation to the newly formed weld. The method of assembly thus improves the quality of the finished product. With the epoxy resin filler, or other equivalent materials, the compressive strength of up to 30,000 psi is obtained.

The foregoing disclosure and description of the invention are illustrative and explanatory thereof, and various changes in the size, shape and materials, as well as in the details of the illustrated construction, may be made without departing from the spirit of the invention.

We claim:

1. An assembly for power or signal transmission between the surface of a well and a downhole component, comprising:
   a continuous metallic cover tube made from at least one sheet rolled into a tube to create a long seam and being of a sufficient length to reach, at one end, from a surface of a well to, at another end, a downhole component without any Intermediate connections;
   at least one conductor extending continuously through said cover tube from said surface to said downhole component;
   a nonmetallic spacer comprising at least one extending member extending from a core which surrounds said at least one conductor to space said at least one conductor; and
   said cover tube Is formed by rolling said sheet over said at least one conductor to create said seam offset from said at least one extending member so that a weld of said seam is not damaged by said at least one extending member, as said cover tube is formed over said spacer.

2. The assembly of claim 1, wherein: said spacer is continuous.

3. The assembly of claim 2, wherein:
   said spacer defines a continuous passage through said cover tube.

4. The assembly of claim 3, wherein:
   said passage is substantially filled with a substantially incompressible material, said material prevents gas or liquid flow therethrough if said cover tube is compromised.

5. The assembly of claim 3, wherein:
   said spacer comprises at least one fin extending from said core which surrounds said at least one conductor.

6. The assembly of claim 5, wherein:
   said fin has a core end where it is connected to said core and a cover tube end where it contacts said cover tube, said core end configured to preferentially fail under stress loading to facilitate removal of said fin from adjacent said surface or downhole component ends of said cover tube to facilitate connection of said at least one conductor.

7. The assembly of claim 1, further comprising,
   an Insulator covering said at least one conductor and disposed between said at least one conductor and said spacer.

8. The assembly of claim 7, wherein:
   said insulator is disposed over said at least one conductor In such a manner that It will break rather than said at least one conductor breaking when said spacer is exposed at either end of said cover tube and bent to facilitate removal of excess of said spacer and said Insulator when making a connection with said at least one conductor.

9. The assembly of claim 7, wherein:
   said insulator and said spacer are co-extruded over said at least one conductor.

10. The assembly of claim 7, wherein:
    said insulator is wrapped around said at least one conductor and said spacer is extruded over said insulator covering.

11. The assembly of claim 1, wherein:
    said cover tube with said at least one conductor and said spacer therein is sufficiently flexible to be coiled on a reel prior to use.

12. The assembly of claim 1, wherein:
    said spacer is extruded over said at least one conductor.
    said insulator and said spacer are co-extruded over said at least one conductor.

13. The assembly of claim 1, further comprising:
    an insulator covering said at least one conductor and disposed between said at least one conductor and said spacer.

14. The assembly of claim 13, wherein:
    said insulator is disposed over said at least one conductor in such a manner that it will break rather than said at least one conductor breaking when said spacer is exposed at either end of said cover tube and bent to facilitate removal of excess of said spacer and insulator when making a connection with said at least one conductor.

15. The assembly of claim 14, wherein:
    said insulator and said spacer are co-extruded over said at least one conductor.

16. The assembly of claim 13, wherein:
    said insulator is wrapped around said at least one conductor and said spacer is extruded over said insulator covering.

* * * * *